United States Patent Office 2,984,579
Patented May 16, 1961

2,984,579

METHODS OF MAKING A LIGNOCELLULOSE PRODUCT AND PRODUCTS RESULTING THEREFROM

William T. Glab, Dubuque, Iowa, assignor, by mesne assignments, to Durel Incorporated, Dubuque, Iowa, a corporation of Iowa No Drawing. Filed Oct. 2, 1958, Ser. No. 764,734

6 Claims. (Cl. 106—163)

This invention relates to methods of making a lignocellulose product and to the products resulting therefrom.

This application is a continuation-in-part of my copending application, Serial No. 443,711, filed July 15, 1954, now U.S. Patent No. 2,864,715.

It is an object of this invention to provide an improved method of making a moldable composition comprising reacting an essentially dry mixture including comminuted lignocellulose and a reactant including acetylene while confining the mixture of lignocellulose and reactant under superatmospheric pressure.

Another object of this invention is to provide such a method wherein the reaction is conducted in an atmosphere of steam at about 300–550° F. for about 4–60 minutes.

A further object of the invention is to provide lignocellulose products prepared by the above methods.

Other objects and advantages of the invention will be apparent from the following description of several embodiments of the invention.

An important advantage of the invention appears to be the controlling of the reaction so that the alpha cellulose is reduced in molecular size sufficiently to prevent swelling of subsequently fabricated products but not to the extent that toughness of fibre is lost. This latter occurs under drastic degradation and starts to become quite serious when approximately 25% of the lignocellulose has been lost as either gaseous or soluble by-products.

Another advantage appears to be the plasticization of the lignin component during the controlled cellulose degradation so that the lignin can subsequently be made to flow and function as a binder between the comminuted lignocellulose particles.

Another advantage is the provision of a relatively dry system so that high capacity for the processing of, for example, wood waste is attained. This is not possible in a wet process such as ordinarily found in a pulping process in which the reactor is charged with approximately 90% water which takes up space as well as requires the addition of large amounts of energy to bring the reaction medium to the proper temperature.

Another advantage is the contacting of lignocellulose or dry mixes of lignocellulose and other ingredients under superatmospheric pressure with a vapor or combination of vapors functioning both as a heat transfer medium and as a reactant.

In the method of this invention an essentially dry mixture including comminuted lignocellulose and a reactant including acetylene or a material capable of generating acetylene is reacted as by heating while confining the lignocellulose and the reactant under superatmospheric pressure as in an autoclave. During the reaction the lignocellulose bond is apparently broken and the lignin is released to operate as a binder.

It appears that the hemicelluloses are the primary constituents of the lignocellulose which are attacked by hydrolysis, but that under the high pressure and temperature of this invention a portion of the hydrolysates are further converted to higher molecular weight materials which can function as plasticizers for the autoclave product when it is molded. At the same time a controlled degradation of the alpha cellulose is carried out to the extent that the desired degree of moisture stability is obtained in the molded or extruded products without an unnecessary loss of toughness. These actions are believed to occur although they have not been absolutely proven.

The methods of this invention may be carried out batchwise in an autoclave or a sealed press or continuously in a continuous contactor.

The lignocellulose which appears dry to the touch actually contains up to about 30% water before the reaction begins.

The lignocellulose which may be used in this invention includes wood as well as other lignocellulosic vegetable materials. The lignocellulose is finely divided so that the particles are preferably not more than 20 mesh in size as measured by a standard screen although smaller sizes are preferred.

During the reaction which takes place in a confined atmosphere under superatmospheric pressure various reaction products are produced although the exact nature of the reactions is not understood. It appears that the reaction products are either inert so that the product itself is inert, have a binding action such as is true of the lignin produced, are gaseous by-products, or are polymerized. By hydrolyzing and partially removing, or polymerizing the hemicelluloses to lignin type materials, the ratio of lignin and other binders to the alpha-cellulose is increased so that the general nature of the lignocellulose mixture is drastically changed.

The high pressure method of this invention has a number of advantages that are not possible with reactions taking place at ordinary pressures and in an unconfined state. In the preferred process, steam is introduced into the autoclave both for heating purposes and to supply moisture for the reaction. In the high pressure method of this invention heat transfer is much more rapid so that in general a shorter reaction time is required. Furthermore, energy losses during the reaction are greatly reduced. In the ordinary reacting mixture these energy losses result from the release of volatile materials such as water vapor, gaseous reaction by-products and the like. As the reaction here takes place in a confined atmosphere, no such losses occur to any material degree. Furthermore, the energy supplied by the steam or vapor is utilized to heat only the lignocellulose with its approximately normal moisture content in contrast to pulping type reactions where large quantities of water are present, requiring far greater expenditures of energy.

Another important advantage of this process is the close control that is obtained over the reaction. Thus the temperature of the reacting mass, and hence the rate of reaction, can be easily raised or lowered by controlling the rate of flow, pressure and the temperature of the heat transfer medium which may be steam, oil vapor, or other high temperature fluids. Reactions may easily be stopped by flashing the heat transfer medium from the autoclave since the large energy loss on expansion cools the reacting mass below the incipient reaction point. During the practice of the process the reacting mixture may be confined in a jacketed vessel with the heating medium introduced to the chambers in the quantity and temperature desired.

A very important advantage of the invention is that volatile reactants may be used as the reacting mass is in a confined space. Volatile reactants are impossible, of course, when the reacting mass is in the open. As a result of the rapid heat transfer achieved by this invention and the penetration of volatile reactants the reaction not only proceeds to completion in a much shorter time but the final product tends to be more uniform than where the reactants are heated such as in an ordinary process that depends upon surface temperature differentials.

Tests have shown that the confining of the reacting mass in the autoclave not only causes retention of the by-products of reaction within the mass even when the by-products are gaseous but also causes polymerization of all or a portion of these by-products, even some that are gaseous. In so-called wet processes large quantities of the by-products of reaction go into solution and are lost.

Another advantage of the invention is that the volatile by-products are easily collected and removed at low cost for later use where desired or to prevent the creation of a nuisance.

Where volatile reactants are used in conjunction with the acetylene no mechanical mixing of the ingredients is required. The results in a considerable saving in time, labor and other factors. Thus, in these instances, it is only necessary to charge the reactor with the lignocellulose and introduce the volatile materials into the reactor under superatmospheric pressure. In addition, if desired, the reactants can be changed or modified during the course of a run. This is not possible to such a degree in a wet process where the charge generally contains less than 50% of lignocellulose, and addition of reactants would in many cases cause prohibitive amounts to go into solution.

A further advantage of utilizing a vapor process is that the volatile content of the reaction product which is primarily moisture can be controlled. By using superheated steam with a sufficient degree of superheat, products on the order of 1% or lower volatile content can be obtained. Under normal conditions, 10 to 15 degrees of superheat at 300 pounds per square inch steam pressure will produce a product of 3–5% volatile content. Thus the expensive drying step connected with wet processes can be avoided.

Because of rapid penetration of reactants under high pressure, larger sized particles can be charged to the autoclave than would ordinarily be used, and a savings in size reduction cost made as a result of lower power requirements to reduce the treated material in comparison with raw lignocellulose.

In addition, where flat stock or preformed material is being made as in a sealed press, the products can be made much thicker and more uniform than in an ordinary press which depends upon high platen temperatures for heat transfer, and in many cases requires almost prohibitive cycle times.

The products of the reactions of this invention may be finished shaped materials or moldable compositions that may be used to make molded products. Where the product is molded after the reaction, this product is preferably removed from the reaction vessel and then ground to a fine powder that is preferably not over 50 mesh in size. The finely divided moldable material is heated to a temperature just sufficient to cause the material to flow and fill the mold under the pressure used. This temperature is kept sufficiently low, however, that losses are minor and breakdown due to decomposition is kept to a minimum. The preferred temperature is between 250–400° F.

The molding pressure may be any pressure sufficient to cause the material to fill completely the mold and will vary depending upon the shape of the mold, the nature of the moldable material and other factors. In the preferred process to produce high density materials this pressure is between 2,000–10,000 pounds per square inch. The molding time is only sufficient to cause the moldable material to fill the mold and set, and again will vary depending upon the type of mold being used, the temperature, the nature of the moldable material and similar factors. In general, the molding time will vary between 0.2–15 minutes.

The flow of the moldable material of this invention is improved and a shorter time is required if a plasticizer is added.

Plasticizers in general which have been found to be effective with the moldable materials include water; aromatic compounds containing a hydroxyl group such as aniline, phenol and cresol, alcohols such as benzyl, diethyleneglycol, glycerol, and furfuryl; nitrogen compounds such as formamide, urea, pyridine, and triethanolamine; and furfural.

The preferred plasticizers are water, furfural, aniline and phenol and the quantity utilized may vary depending on the flow desired. The preferred quantity is between about 2–20%.

In particular, the choice of plasticizer will depend upon the end use or method of fabrication of the material. The reaction products themselves are of a slow thermosetting nature. Thus, if a plasticizer such as water which is incapable of thermoset is used, the material is essentially of a thermoplastic nature. This is also true of the preferred plasticizers as a group; however, when desired, thermoset compositions can be made by using furfural, aniline or phenol in conjunction with a catalyst and, if desired, other materials capable of copolymerization.

Materials which will function as catalysts include the oxides, hydroxides and carbonates of the alkali and alkaline earth metals. The preferred catalysts are the oxides of magnesium and zinc.

Among the materials which may be used with the thermosetting plasticizers as copolymers are hexamethylene tetramine, dimethylolurea, paraformaldehyde and urea.

Depending upon the set time required, about 0.5–5.0% of the catalyst and about 0.5–10% of the copolymer are used.

If desired, thermoset products can be obtained without the use of catalysts or copolymers merely by heat treating the fabricated products after they have been molded or extruded.

If desired, products of density ranging from 0.2–1.3 specific gravity may be produced in the high pressure reacting vessel itself without requiring a subsequent molding operation as described above with high pressure molding. Here the finely divided lignocellulose and the reactant are mixed and the mixture cold pressed into the desired shape or compacted in a sealed press. The compressed mixture is then heated in the press or other high pressure vessel for the required time at the required temperature and pressure. The material when removed from the reaction vessel will then be found to be quite hard and strong. In these instances, the reactant may be any of those set out above.

Steam may or may not be supplied to the reaction vessel depending upon the result desired. If steam is used, it is preferably supplied at 100–1000 pounds per square inch pressure and at a temperature of 400–550°

F. In the event that a sealed press is used, the normal moisture content of the wood as well as the reaction by-products may be used to build up to a predetermined pressure which can be maintained constant by venting the excess vapors produced. This pressure is preferably between 100–600 pounds per square inch. Such a procedure eliminates the blow-ups encountered in treating wood in an ordinary hot press at high temperatures, as well as drastically reducing press time, and polymerizes a percentage of the gaseous and low molecular weight by-products to resinous-like materials which function as binders for lignocellulose particles. If desired, a two step process may be used in which the first step includes the pressure treatment and the second step includes venting the vapors to atmospheric pressure followed by a 2–10 minute heat treatment period before removing the material from the press or the autoclave.

*Example 1*

Finely divided lignocellulose containing only its normal moisture content of approximately 6% was mixed with 5% by weight of calcium carbide for ½ hour in a ball-mill. The mixture was then placed in a heated autoclave, and steam was admitted until the pressure was 300 pounds per square inch and the temperature was approximately 440° F. The mixture was held under these conditions for 25 minutes and then the steam was rapidly flashed off. The reacting mixture was removed from the autoclave, and all particles which had consolidated were thoroughly broken up. The moisture or volatile content of this product was approximately 10%. During the course of this reaction, the calcium carbide reacts with water to provide acetylene which itself is capable of reacting with the lignocellulose under the high temperature and pressure conditions of this invention.

In a similar manner lignocellulose was reacted with calcium carbide in conjunction with other materials. The following table sets forth the compositions and autoclave conditions under which these reactions were run.

| Example | Percent Carbide | Percent Additive | Autoclave | | |
|---|---|---|---|---|---|
| | | | Time, Min. | Temp., °F. | Press., p.s.i. |
| 2 | 5.0 | 15% Vinsol+5% Aniline+2% Zinc Oxide. | 25 | 440 | 300 |
| 3 | 5.0 | 10% Sulfur+5% Aniline | 25 | 440 | 300 |
| 4 | 5.0 | 12% Sulfur+15% Vinsol+5% Aniline. | 25 | 440 | 300 |
| 5 | 2.5 | 12% Sulfur+15% Vinsol+5% Aniline+2% Zinc Oxide. | 25 | 440 | 300 |

In the above table the amount of carbide and additives are by weight of the lignocellulose. The calcium carbide is preferably used in an amount equal to between about 1–20% of the weight of the lignocellulose. Where liquid additives such as aniline are used, they are preferably added to the dry mixture of lignocellulose, carbide and other materials after the solids have been thoroughly blended in a mixing device.

Lignocellulose has been similarly reacted in an autoclave using acetylene gas rather than the calcium carbide. Where this is done, the lignocellulose or blend of lignocellulose and other additives is placed in the heated autoclave, the autoclave is partially evacuated to approximately 15 inches of mercury, and the autoclave is filled with acetylene to the desired pressure. The following table lists a number of these reactions which have been employed, along with the autoclave conditions under which they were run.

| Example | Acetylene, p.s.i. Gauge | Additive | Autoclave | | |
|---|---|---|---|---|---|
| | | | Time, Min. | Temp., °F. | Press., p.s.i. |
| 6 | 50 | None | 30 | 440 | 300 |
| 7 | 50 | 5% Aniline+2% Zinc Oxide. | 25 | 440 | 300 |
| 8 | 50 | 15% Vinsol+5% Aniline+2% Zinc Oxide. | 25 | 440 | 300 |
| 9 | 50 | 1% Zinc Chloride | 20 | 440 | 300 |
| 10 | 50 | 1% Ferric Chloride | 20 | 440 | 300 |
| 11 | 50 | 10% Formaldehyde+5% Ammonium Hydroxide. | 25 | 440 | 300 |
| 12 | 60 | 12% Sulfur+15% Vinsol+5% Aniline+2% Zinc Oxide. | 25 | 440 | 300 |
| 13 | 15 | do | 25 | 440 | 300 |
| 14 | 70 | 6% Sulfur+8% Vinsol | 25 | 440 | 300 |
| 15 | 50 | 12% Sulfur+15% Vinsol+10% Acetone. | 25 | 440 | 300 |
| 16 | 40 | 10% Sulfur+5% Aniline+2% Zinc Oxide. | 25 | 440 | 300 |
| 17 | 50 | 12% Sulfur+15% Vinsol+5% Aniline+2% Zinc Oxide+10% Formaldehyde. | 25 | 440 | 300 |
| 18 | 50 | 12% Sulfur+15% Vinsol | 25 | 440 | 300 |
| 19 | 50 | 12% Sulfur+15% Vinsol+5% Aniline. | 25 | 440 | 300 |
| 20 | 50 | 12% Sulfur+15% Vinsol+5% Aniline+2% Zinc Oxide+10% Adol 40. | 30 | 440 | 300 |
| 21 | 50 | 12% Sulfur+15% Vinsol+5% Aniline+2% Zinc Oxide+10% Butarez 15. | 30 | 440 | 300 |
| 22 | 50 | 12% Sulfur+15% Vinsol+5% Aniline+2% Zinc Oxide+10% Butarez 15+1% Cumene Hydroperoxide. | 30 | 440 | 300 |
| 23 | 50 | 12% Sulfur+15% Vinsol+5% Aniline+2% Zinc Oxide+5 p.s.i. Sulfur Dioxide. | 20 | 440 | 300 |
| 24 | 50 | 12% Sulfur+15% Vinsol+5% Aniline+2% Zinc Oxide+10% Castor Oil. | 20 | 440 | 300 |

The amount of all additives in the preceding table is based on the weight of the lignocellulose. Where acetylene gas is used the preferred acetylene pressure in the autoclave is between about 5–100 pounds per square inch. Where acetylene is reacted with lignocellulose in conjunction with additives given in the previous table, the preferred quantities of these materials are shown in the following table.

Additive: \ Preferred amount, percent
Vinsol _____ 2–25
Sulfur _____ 1–20
Formaldehyde _____ 1–20
Acetone _____ 2–20
Aniline _____ 1–15
Ammonium hydroxide _____ 1–10
Sulfur dioxide _____ [1]1–25
Zinc chloride _____ 0.5–6
Zinc oxide _____ 0.5–6
Ferric chloride _____ 0.5–5
Castor oil _____ 1.0–20
Butarez _____ 2.0–25
Adol 4D _____ 1.0–20

[1] P.s.i. (pressure).

With the exception of sulfur dioxide, all of the above amounts are based on the weight of the lignocellulose.

Having described my invention as related to the embodiments set out herein, it is my intention that the invention be not limited by any of the details of description unless otherwise specified, but rather be construed broadly within its spirit and scope as set out in the accompanying claims.

I claim:
1. The method of making a lignocellulose product, consisting essentially of: intimately mixing particles of lignocellulose with a member of the class consisting of acetylene at a pressure of about 5–100 pounds per square inch, gauge and about 1–20% calcium carbide by weight of the lignocellulose in the presence of moisture; and heating the resulting composition under pressure for a time and at a temperature sufficient to combine chemically said member with the lignocellulose.

2. The method of making a lignocellulose product, consisting essentially of: intimately mixing particles of lignocellulose with acetylene at a pressure of about 5–100 pounds per square inch, gauge; and heating the resulting composition under pressure for a time and at a temperature sufficient to combine chemically said acetylene with the lignocellulose.

3. The method of making a lignocellulose product, consisting essentially of: intimately mixing particles of lignocellulose with about 1–20% calcium carbide by weight of the lignocellulose in the presence of moisture; and heating the resulting composition under pressure for a time and at a temperature sufficient to combine chemically said calcium carbide and moisture reaction products with the lignocellulose.

4. A lignocellulose product prepared by the method of claim 1.

5. The method of making a lignocellulose product, consisting essentially of: intimately mixing particles of lignocellulose with acetylene at a pressure of about 5–100 pounds per square inch, gauge; and heating the resulting composition at a pressure of between about 100–1000 pounds per square inch at a temperature of about 300–550° F. for about 4–60 minutes.

6. The method of making a lignocellulose product, consisting essentially of: intimately mixing particles of lignocellulose with about 1–20% calcium carbide by weight of the lignocellulose in the presence of moisture; and heating the resulting composition at a pressure of between about 100–1000 pounds per square inch at a temperature of about 300–550° F. for about 4–60 minutes.

References Cited in the file of this patent

UNITED STATES PATENTS

| | | |
|---|---|---|
| 2,156,160 | Olson et al. | Apr. 25, 1939 |
| 2,325,570 | Katzen et al. | July 27, 1943 |
| 2,552,597 | Smith et al. | May 15, 1951 |

FOREIGN PATENTS

| | | |
|---|---|---|
| 497,477 | Great Britain | Dec. 16, 1938 |

OTHER REFERENCES

Nikitsin et al.: Zhur, Priklad. Khim, vol. 30, pages 750–763 (1957). (Abstracted in Chem. Abstracts, vol. 51 at 1715h.)